(12) United States Patent
Wyatt

(10) Patent No.: US 8,718,056 B2
(45) Date of Patent: *May 6, 2014

(54) TRUNKING IN A MATRIX

(75) Inventor: Richard M. Wyatt, Ottawa (CA)

(73) Assignee: Mosaid Technologies Incorporated, Ottawa, Ontario (CA)

(*) Notice: Subject to any disclaimer, the term of this patent is extended or adjusted under 35 U.S.C. 154(b) by 48 days.

This patent is subject to a terminal disclaimer.

(21) Appl. No.: 13/437,177

(22) Filed: Apr. 2, 2012

(65) Prior Publication Data

US 2012/0243411 A1 Sep. 27, 2012

Related U.S. Application Data

(63) Continuation of application No. 11/981,409, filed on Oct. 31, 2007, now Pat. No. 8,165,117, which is a continuation of application No. 10/066,550, filed on Jan. 31, 2002, now Pat. No. 7,313,135.

(51) Int. Cl.
*H04L 12/56* (2011.01)

(52) U.S. Cl.
USPC .......................................................... 370/389

(58) Field of Classification Search
USPC .......................................................... 370/389
See application file for complete search history.

(56) References Cited

U.S. PATENT DOCUMENTS

| | | |
|---|---|---|
| 3,978,291 A | 8/1976 | Bergeron, Jr. et al. |
| 4,340,775 A | 7/1982 | Gesek et al. |
| 4,983,961 A | 1/1991 | Brunle et al. |
| 5,144,293 A | 9/1992 | Rouse |
| 5,265,257 A | 11/1993 | Simcoe et al. |
| 5,546,379 A | 8/1996 | Thaweethai et al. |
| 5,689,500 A | 11/1997 | Chiussi et al. |
| 5,689,505 A | 11/1997 | Chiussi et al. |
| 5,905,723 A | 5/1999 | Varghese et al. |
| 5,949,788 A | 9/1999 | Friedman et al. |
| 5,995,612 A | 11/1999 | Doshi et al. |
| 6,016,310 A | 1/2000 | Muller et al. |
| 6,018,766 A * | 1/2000 | Samuel et al. ................ 709/218 |
| 6,031,835 A | 2/2000 | Abali et al. |

(Continued)

FOREIGN PATENT DOCUMENTS

| | | |
|---|---|---|
| EP | 0 649098 | 4/1995 |
| EP | 0 785 699 | 7/1997 |

(Continued)

OTHER PUBLICATIONS

Frazier, H., et al., "*Link Aggregation and Trunking*", IEEE 802 LMSC Tutorial, Montreal, PQ, Nov. 11, 1997, retrieved from the Internet <URL:http//grouper.ieee.org/groups/802/3/trunk-study/tutorial/index.html> on May 14, 2001.

(Continued)

*Primary Examiner* — Dang Ton
*Assistant Examiner* — Kevin Lee
(74) *Attorney, Agent, or Firm* — Winstead PC

(57) ABSTRACT

A multistage switch includes a matrix of coupled switch devices. A logical link comprising a plurality of physical links couples a destination through the plurality of physical links to a plurality of ports in the multistage switch. Each switch device performs trunk aware forwarding to reduce the forwarding of received frames through the matrix of coupled switch devices to the destination in order to reduce unnecessary traffic in the multistage switch.

27 Claims, 14 Drawing Sheets

(56) References Cited

U.S. PATENT DOCUMENTS

| | | | |
|---|---|---|---|
| 6,044,080 | A | 3/2000 | Antonov |
| 6,085,238 | A | 7/2000 | Yuasa et al. |
| 6,188,759 | B1 | 2/2001 | Lorenzen et al. |
| 6,216,199 | B1 | 4/2001 | DeKoning et al. |
| 6,359,879 | B1 | 3/2002 | Carvey et al. |
| 6,363,077 | B1 | 3/2002 | Wong et al. |
| 6,460,088 | B1 | 10/2002 | Merchant |
| 6,470,389 | B1 | 10/2002 | Chung et al. |
| 6,496,502 | B1 | 12/2002 | Fite, Jr. et al. |
| 6,553,028 | B1 | 4/2003 | Tang et al. |
| 6,580,715 | B1 | 6/2003 | Bare |
| 6,807,172 | B1 | 10/2004 | Levenson et al. |
| 6,807,179 | B1 | 10/2004 | Kanuri et al. |
| 6,901,452 | B1 * | 5/2005 | Bertagna ............... 709/240 |
| 7,313,135 | B2 | 12/2007 | Wyatt |
| 8,165,117 | B2 | 4/2012 | Wyatt |
| 2002/0024949 | A1 | 2/2002 | Tomonaga et al. |
| 2002/0051427 | A1 | 5/2002 | Carvey |
| 2003/0035422 | A1 | 2/2003 | Hill |
| 2003/0043825 | A1 | 3/2003 | Magnussen et al. |
| 2003/0123448 | A1 * | 7/2003 | Chang .................. 370/395.1 |
| 2008/0123528 | A1 | 5/2008 | Wyatt |

FOREIGN PATENT DOCUMENTS

| | | |
|---|---|---|
| EP | 0 863 646 A2 | 9/1998 |
| EP | 0 910 195 A2 | 4/1999 |
| EP | 0 889 624 A1 | 7/1999 |
| WO | WO 99/56432 | 4/1999 |
| WO | WO 01 65777 | 9/2001 |
| WO | WO 03/065657 A1 | 8/2003 |

OTHER PUBLICATIONS

Conant, G.E., "Multilink PPP: One Big Virtual WAN Pipe", *Data Communications*, No. 13:85-90 (Sep. 21, 1995).

"Tutorial on Link Aggregation and Trunking," Nov. 1997, http://grouper.ieee.org/groups/802/3/trunk_study/tutorial/index.html.

"IEEE 802.3 Study Group Interim meeting," Feb. 1998, http://grouper.ieee.org/groups/803/3/trunk_study/February98/index.html.

"IEEE 802.3 Study Group Mar. 1998 Plenary week meeting," Mar. 1998, http://grouper.ieee.org/groups/802/3/trunk_studymarch98/index.html.

"IEEE 802.3 Study Group Interim meeting," Apr. 1998, http://grouper.ieee.org/groups/802/3/trunk_study/april98/index.html.

"Link Bundling on Cisco 12000 Series Internet Routers," *Cisco IOS Release*, 12.0)23)S, pp. 1-34, May 5, 2006.

Stunkel, C.B., et al. "The SP2 High-Performance Switch," *IBM Systems Journal*. vol. 34, No. 2, pp. 185-204, (1995).

International Search Report in International Application No. PCT/CA03/00138, mailed Apr. 23, 2003.

\* cited by examiner

| 806 | | | |
|---|---|---|---|
| 822 VERS | 834 HLEN | 836 TOS | 828 TOTAL LENGTH |
| 830 IDENTIFICATION | | 832 FLAGS | 834 FRAGMENT OFFSET |
| 836 TTL | 840 PROTOCOL | 842 HEADER CHECKSUM | |
| 844 IP SOURCE ADDRESS | | | |
| 846 IP DESTINATION ADDRESS | | | |
| 848 OPTIONS | | | 850 PAD |

PRIOR ART

FIG. 8C

TRUNKING IN A MATRIX

RELATED APPLICATIONS

This application is a continuation of U.S. application Ser. No. 11/981,409, filed Oct. 31, 2007, now U.S. Pat. No. 8,165,117, which is a continuation of U.S. application Ser. No. 10/066,550, filed Jan. 31, 2002, now U.S. Pat. No. 7,313,135. The entire teachings of the above applications are incorporated herein by reference.

BACKGROUND OF THE INVENTION

A networking switch device receives frames through a number of ingress ports connected to the switch device and forwards the frames through a number of egress ports connected to the switch device. The switch device determines one or more egress ports through which the received frames are forwarded dependent on the destination address included in the frame.

A logical link can be configured to increase the bandwidth to a destination; that is, the number of frames that can be forwarded through the switch device. A logical link includes a plurality of egress ports in the switch through which frames can be forwarded to the destination. Configuring multiple ports to forward frames to a destination is called link aggregation or trunking. The egress ports in the logical link are configured as members of the logical link or the trunk group.

A multistage switch includes a plurality of coupled switch devices. One well-known method for providing a multistage switch is the 3-stage Clos network. The multistage switch includes external ports for receiving frames from a source and forwarding frames to a destination. Each switch device in the multistage switch (or matrix) includes internal ports for forwarding frames within the matrix.

Typically, a frame received from a source at one external port is forwarded through the switch devices in the multistage switch to another external port dependent on a destination address associated with the frame. A switch device in the matrix forwards a received frame to one of its output ports dependent on a destination address included in the frame. The destination address may be for a host such as a computer, another multistage switch or a router.

SUMMARY OF THE INVENTION

To provide redundancy, a logical link can include external ports on different switch devices in the multistage switch. The selected member of a trunk group for a frame arriving at an external port in the multistage switch may be on the switch device receiving the frame or on another switch device.

Each switch device forwards a received frame based on local forwarding information stored in a forwarding table in the respective switch device. When forwarding a frame to a trunk group, the frame is forwarded to each switch device having a member of the trunk group. For example, if members of a trunk group can be reached through internal ports 0 and 1 of the switch device, the frame is forwarded through both ports. Thus, a frame may be needlessly forwarded throughout the matrix of switch devices before being forwarded to the selected member of the trunk group, resulting in unnecessary traffic in the matrix. Unnecessary traffic in the matrix of switch devices can be reduced by performing matrix trunk aware forwarding in each switch device.

A logical link including a plurality of physical links, i.e. a trunk group, couples a destination to a multistage switch. The multistage switch includes a plurality of external ports. Each physical link is coupled to one of the plurality of external ports. The multistage switch also includes a matrix of coupled switch devices. A frame received for the destination is forwarded through at least one of the switch devices to one of the physical links in the logical link. The switch device which receives the forwarded frame forwards the frame based on the logical link to reduce the number of subsequent switch devices through which the frame is forwarded.

The switch device also includes a trunk table selector which selects a trunk table for the logical link to reduce the number of ports of the switch device through which to forward the frame. The trunk table for the logical link may be shared by another logical link.

The switch device may also include flow hash logic which indexes a flow hash for the received frame dependent on a destination address and a source address included in the received frame. The switch device may also include an echo suppression table. The echo suppression table includes an entry for each port. The entry is selected dependent on the port receiving the frame. The selected entry ensures that the frame is not forwarded to any member of the logical link on which it was received. The echo suppression table includes an entry for each external port at which a frame is received. The physical links may be coupled to external ports on different switch devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8C illustrates the format of an IP network layer (L3) header shown in FIG. 8A;

DETAILED DESCRIPTION OF THE INVENTION

A description of preferred embodiments of the invention follows.

Figure 1:
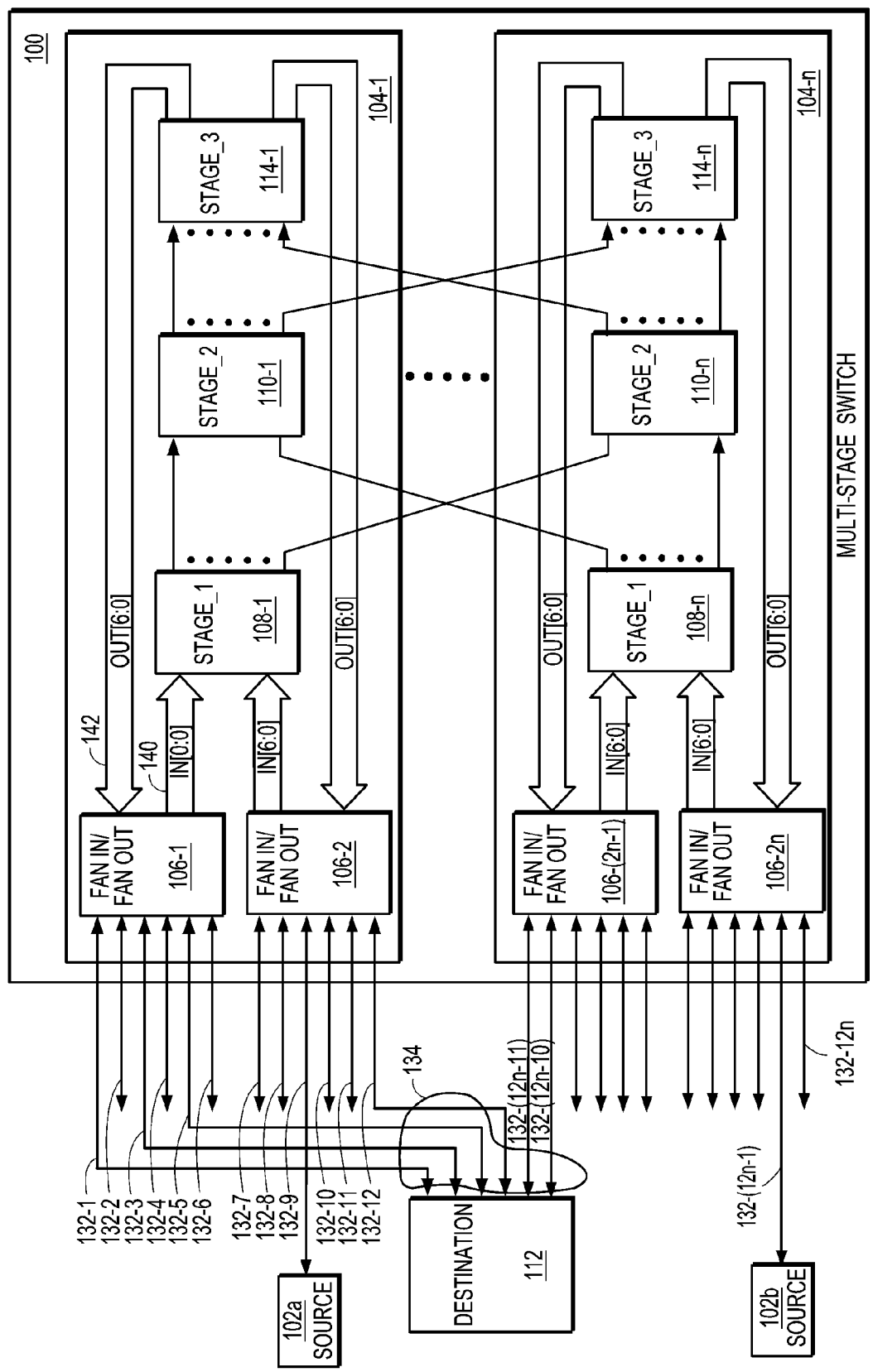
FIG. 1 illustrates a multistage switch including a logical link connecting a destination to the switch according to the principles of the present invention.

FIG. 1 illustrates a logical link or trunk group 134 connecting a destination 112 to a multistage switch 100 according to the principles of the present invention. The multistage switch 100 includes a matrix of coupled switch devices 106-1, . . . 106-2n, 108-1, . . . 108-n, 110-1, . . . 110-n, 114-1, . . . 114-n organized in rows and columns. Each row 104-1, . . . 104-n includes five switch devices. As shown, row 104-1 includes two fan in/fan out devices 106-1, 106-2, a stage-1 device 108-1, a stage-2 device 110-1 and a stage-3 device 114-1. To provide redundancy especially, members of trunk group 134 are distributed among the rows in the multistage switch.

Each fan in/fan out device 106-1, . . . 106-2n is coupled to a plurality of the external switch ports 132-0, . . . 132-12n in the multistage switch. Each external switch port 132 receives and transmits frames. A received frame is forwarded by the respective fan-in/fan-out device on one of six uplink ports 140 to a stage-1 device 108. A frame to be transmitted from the multistage switch is received by the respective fan-in/fan-out device from a stage-3 114 device on one of six downlink ports 142.

A unicast frame received on any one of the external ports 132 is forwarded by at least one of the matrix of switch devices to another external port 132 dependent on the source and destination address included in the frame. Echo suppression is performed in each switch device to prevent the unicast frame from being transmitted through the external port on which it was received. A unicast frame received at external port 132-0 coupled to fan-in/fan-out device 106-1 is forwarded to a destination address coupled to external port 132-12n by forwarding the frame through fan-in/fan-out device 106-1, stage-1 device 108-1, one of the plurality of a stage-2 devices, a stage-3 device 114-n and fan-in/fan-out device 106-2n in the multistage switch. A unicast frame received at port 132-1 for destination 112 is first forwarded through fan-in/fan-out device 106-1. The frame is then forwarded to stage-1 device 108-1. Stage-1 switch device 108-1 forwards the frame based on a flow hash dependent on the source and destination address included in the frame. The IP destination address included in the frame is used to generate an Egress Port Vector (EPV) to select one of the stage-2 devices 110-2n. The selected stage-2 device 110-2n forwards the frame to one of the stage-3 devices 114-1 . . . 114.2n dependent on the tagged EPV. The selected stage-3 device forwards to one of the fan-in/fan-out devices coupled to the destination 112 dependent on the destination address included in the frame.

In the embodiment shown, the multistage switch 100 includes n rows and 12n ports 132-0, . . . 132-12n. Each row has two fan-in/fan-out devices and each fan-in/fan-out device includes six ports. Ports 132-1, 132-3, 132-5, 132-12, 132-(12n-11), 132-(12n-10) are members of trunk group 134. A frame received for destination 112 from source 102a at port 132-9 or received from source 102b at port 132-(12n-1) can be forwarded to destination 112 through any one of the external ports 132 which are members of trunk group 134.

An external port in trunk group 134 is selected for forwarding a received frame dependent on the data flow; that is, the source address and destination address included in the received frame. By selecting a member of the trunk group 134 dependent on a source address and destination address, frames for the same data flow are always forwarded through the same external port and thus are not mis-ordered through the multistage switch 100.

For example, a frame received by the multistage switch from source 102a at port 132-9 for destination 112 includes the source address for source 102a and the destination address for destination 112. The multistage switch 100 determines the data flow from the source address for source 102a and destination address for 112 stored in the frame. One of the members of trunk group 134 is selected dependent on the data flow.

The forwarding of the frame through the switch devices in the multistage switch 100 creates traffic in the matrix of switch devices. This traffic is necessary for forwarding a frame received on an external port on one switch device to an external port on another switch device. However, if the selected member of a trunk group 134 is coupled to fan-in/fan-out devices in the same row 104-1 as the external port receiving the frame, forwarding the frame through all of the stages of the multistage switch is not necessary. Thus, each switch device needs to perform trunk aware forwarding to reduce the number of frames forwarded through the matrix of switch devices.

A frame received by a fan-in/fan-out device 106 is forwarded to the respective stage-1 device 108 coupled to the fan-in/fan-out device. Upon receiving the forwarded frame, the respective stage-1 device forwards the received frame dependent on the destination address included in the forwarded frame. The stage-1 device generates an Egress Port Vector (EPV) dependent on the included destination address and forwards the EPV in a switch matrix tag included with the frame to a stage-2 device.

Each stage-2 device 110 forwards the received frame to a stage-3 device 114 dependent on the EPV included in the switch matrix tag forwarded by the stage-1 device 108. Each stage-3 device 114 forwards the frame based on an address lookup dependent on the destination address. Each stage-3 device also performs echo suppression dependent on the external port through which the frame was received using the number of the multistage switch source port included in the switch matrix tag forwarded with the frame. By performing echo suppression, the forwarded frame is dropped if the frame is received on a member of the logical link coupling the destination in the multistage switch.

The stage-2 devices 110 do not participate in the forwarding decision for the frame through the multistage switch 100 because they merely forward dependent on the EPV forwarded from the stage-1 devices 108. Hence, the operation of the stage-2 devices 110 can be ignored when describing the forwarding of frames through the matrix of switch devices.

Figure 2:
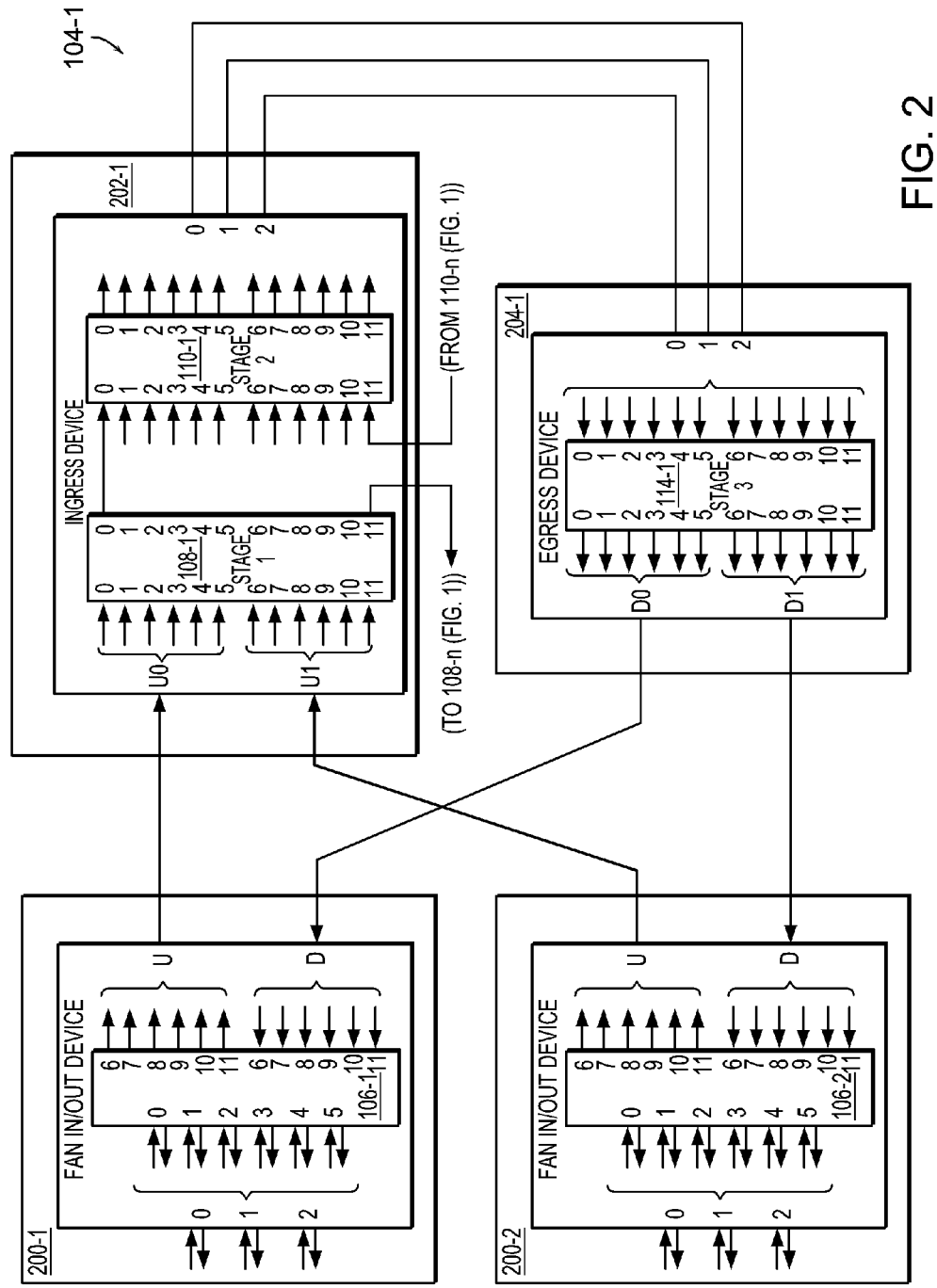
FIG. 2 illustrates a logical representation of the switch devices in any of the rows shown in FIG. 1.

FIG. 2 illustrates a logical representation of the switch devices in row 104-1 shown in FIG. 1. To simplify the description of the operation of the multistage switch 100, the number of ports in each switch device is reduced.

Fan-in/fan-out switch devices 106-1, 106-2 shown in FIG. 1 are represented as respective logical fan-in/fan-out switch devices 200-1, 200-2. The six external ports in fan-in/fan-out switch devices 106-1, 106-2 are reduced to three external switch ports labeled 0, 1 and 2 in logical fan-in/fan-out switch devices 200-1, 200-2. The six internal output ports in fan in/fan out switch devices 106-1 and 106-2 are reduced to a single uplink port labeled U and the six internal input ports are reduced to a single downlink port labeled D.

The stage-1 device 108-1 and the stage-2 device 110-1 have been combined to provide ingress device 202-1 because, as discussed already, the stage-2 device 110-1 does not participate in the forwarding decision. The ingress device 202-1 has two uplink ports labeled U0 and U1 and three internal output ports labeled 0, 1 and 2. The internal output ports are coupled to internal input ports in an egress device 204-1 corresponding to the stage-3 device 114-1 of FIG. 1.

The internal output ports on the egress device 204-1 are reduced to two downlink ports labeled D0 and D1. The downlink ports are coupled to respective downlink ports on the logical fan-in/fan-out devices 200-1, 200-2. The internal input ports on the egress device 204-1 are reduced to three internal input ports.

Figure 3:
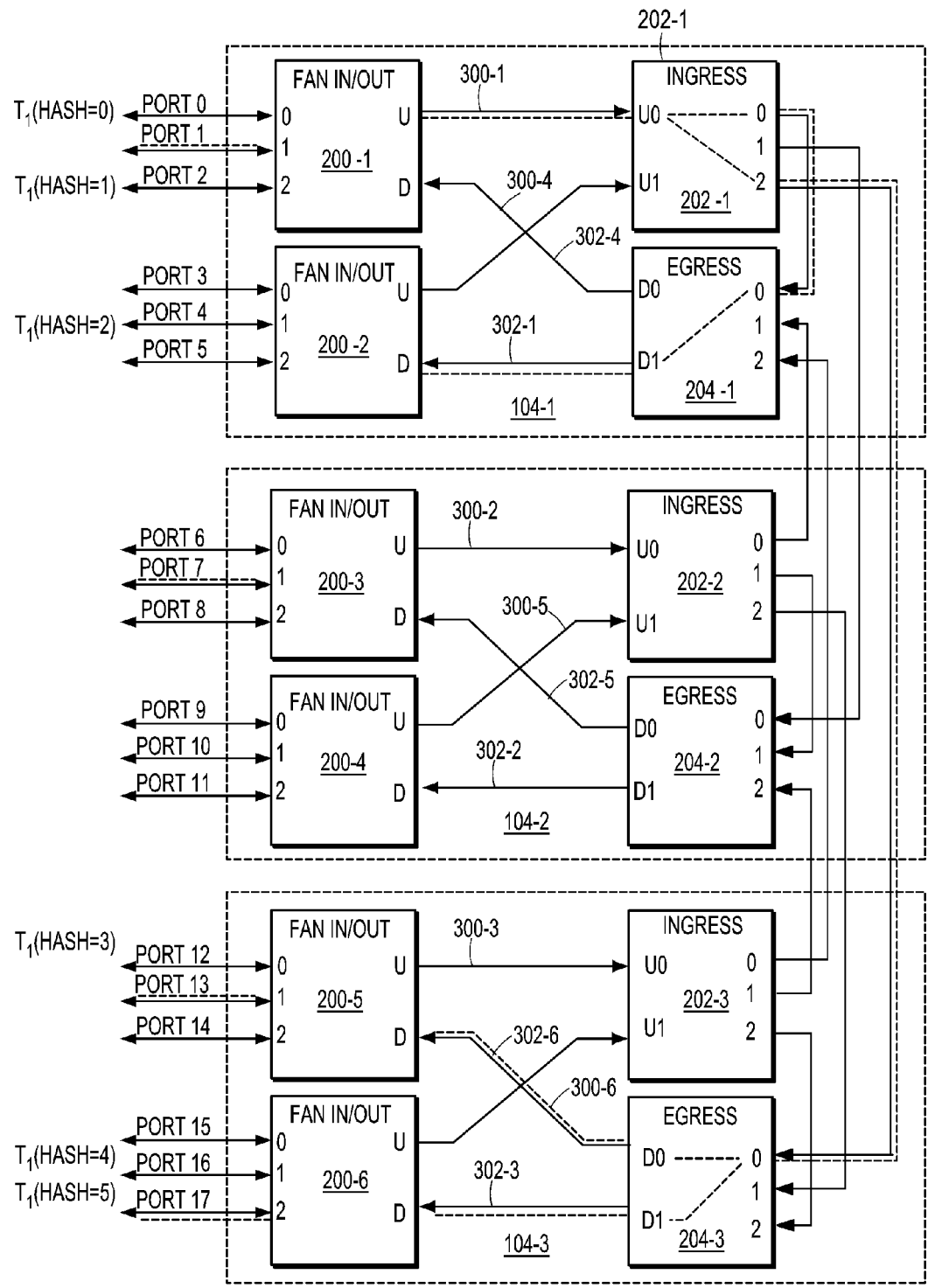
FIG. 3 illustrates unnecessary traffic generated in a multistage switch without matrix trunk aware forwarding.

FIG. 3 illustrates unnecessary traffic in a multistage switch 100 without trunk aware forwarding. Multistage switch 100 has eighteen external ports (Ports 0-17). Each respective row 104-1, . . . 104-3 of switch devices includes six external ports coupled to logical fan-in/fan-out devices. Row 104-1 includes logical fan-in/fan-out devices 200-1, 200-2, an ingress device 202-1 and an egress device 204-1. Uplink port U of logical fan-in/fan-out device 200-1 is coupled through connection 300-1 to uplink port U0 on ingress device 202-1. Downlink port D of logical fan-in/fan-out device 200-1 is coupled through connector 300-4 to downlink port D0 on egress device 204-1. The internal output ports (0, 1, 2) on ingress device 202-1 are coupled to respective internal input ports on egress device 204-1 in a first row 104-1, on egress device 204-2 in a second row 104-2 and on egress device 204-3 in a third row 104-3.

A trunk group T1 in the multistage switch 100 is configured to include external port 0, port 2, port 4, port 12, port 16 and port 17. The trunk group T1 defines multiple physical paths to a destination (not shown) through external ports which are members of trunk group T1. The destination can be another multistage switch. Frames received by the multistage switch for the destination can be forwarded through any of the members of trunk group T1. The member of the trunk group through which to forward a received frame can be selected dependent on a computed hash of a source and destination address included in the header of the received frame so that frames for the same data flow are forwarded through the same external port.

Each member of trunk group T1 is assigned a matrix assigned hash code or set of hash codes. Each switch device in the multistage switch 300 creates a computed hash code for a received frame dependent on the source and destination address included in a frame. A switch device receiving the frame forwards the frame towards the trunk member whose matrix assigned hash code matches this computed hash code. Trunk group T1 has six members. Each member of trunk group T1 has an associated matrix assigned hash code.

As shown in FIG. 3, the matrix assigned hash codes are assigned to the members of trunk group T1 as follows: hash code 0 to external port 0, hash code 1 to external port 2, hash code 2 to external port 4 hash code 3 to external port 12, hash code 4 to external port 16 and hash code 5 to external port 17.

A frame received on an external port which is not a member of trunk group T1 is forwarded through the multistage switch 100 based on the destination address included in the received data frame. For example, a frame received on external port 1 for external port 15, is forwarded through the matrix of switch devices as follows: logical fan-in/fan-out device 200-1 forwards to ingress device 202-1; ingress device 202-1 forwards to egress device 204-3 and egress device 204-3 forwards to logical fan-in/fan-out device 200-6. The frame is forwarded by each switch device dependent on a forward vector computed locally by each switch device.

A frame received at external port 1 for trunk group T1 can be forwarded through any member of the trunk group. For example, the frame can be forwarded through external port 0 or external port 2 in logical fan-in/fan-out device 200-1.

The forward vector for a received frame is determined in each switch device by combining a plurality of vectors. The forward vector selects the ports in the switch device through which the frame is forwarded. A physical forward vector selects all the ports through which a received frame can be forwarded. An echo suppression vector reduces the number of available ports by ensuring that a frame is not forwarded through the port at which it was received. A trunk member vector selects one of the available ports so that frames for the same data flow (same destination and source address) are forwarded through the same trunk member.

In the example shown in FIG. 3, the frame is forwarded to trunk T1 through trunk member 5 on connection 302-3; that is, external port 17 of logical fan-in/fan-out device 200-6. However, extra frames are also needlessly sent to egress device 204-1, logical fan-in/fan-out device 200-2, and logical fan-in/fan-out device 200-5 because a local forwarding decision is made for the frame in each switch device in the multistage switch 300 and every received frame is forwarded to the next stage. The forwarding decision for forwarding a received frame in each switch device is described in more detail in conjunction with FIGS. 4A and 4B.

Figure 4A:
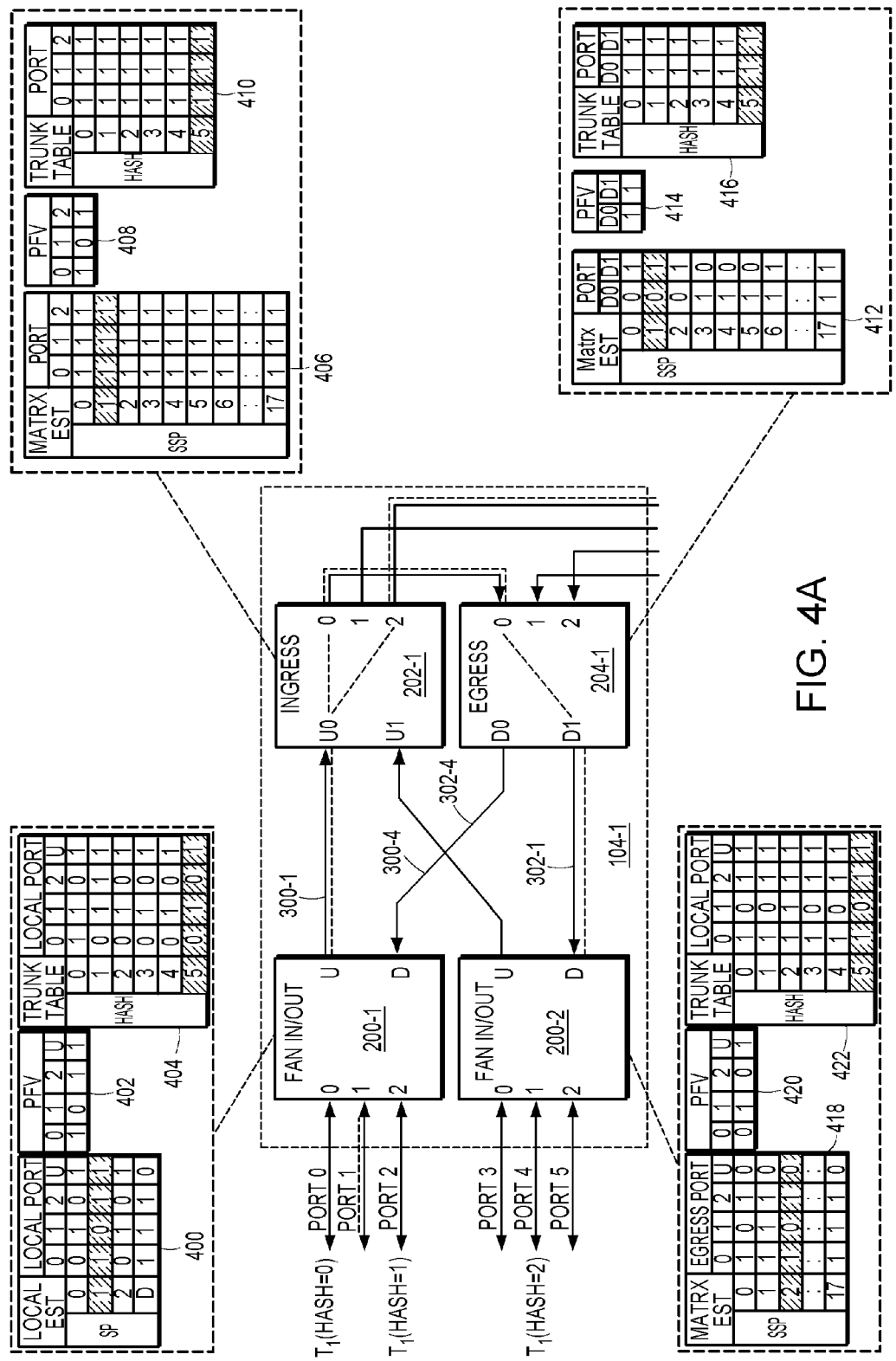
FIGS. 4A-4B illustrate forwarding tables in rows of the multistage switch shown in FIG. 3.

FIG. 4A is a block diagram of row 104-1 in the multi-stage switch shown in FIG. 3 illustrating forwarding tables stored in each of the switch devices. The forwarding decision for a received frame in each switch device is dependent on the vectors from the entries selected in three forwarding tables as explained above; an echo suppression table (EST), a physical forward vector table and a trunk member vector table. Looking at fan-in/fan-out device 200-1, external Ports 0, 1, 2 are bidirectional, and internal ports U and D are unidirectional. Echo suppression table 400 stored in logical fan-in/fan-out device 200-1 includes an entry for each respective input port; that is, 0, 1, 2, and downlink port D. Each echo suppression table entry includes a bit for each output port; that is 0, 1, 2, and uplink port U. A bit is set '1' in the echo suppression table entry to indicate that the frame can be forwarded through the respective output port. For example, referring to the entry for input port 1, all bits are '1' except for port 1, to indicate that a frame received on port 1 cannot be forwarded on port 1, that is, the input port at which the frame was received. Referring to the entry for port 0, all bits are '1' except ports 0 and 2 because both ports 0 and 2 are members of trunk group T1. Thus, each entry in the echo suppression table performs echo suppression by ensuring that a frame received by a member of trunk group T1 cannot be forwarded through any other member of trunk group T1.

The physical forward vector (PFV) table 402 in logical fan-in/fan-out device 200-1 includes a PFV for the destination address associated with trunk group T1. The PFV has a bit for each output port; that is, 0, 1, 2, and U in the logical fan-in/fan-out device. A bit set to '1' in the PFV indicates that the frame can be forwarded through the respective port. Bits for port 0, 2 and U are '1' because there are members of the trunk group on ports 0, 2 and on other switch devices which can be reached through the U port.

The trunk table 404 in logical fan-in/fan-out device 200-1 includes an entry for each hash value. In trunk 1 there are six members and thus six hash values. One trunk table is used to forward all frames received by the logical fan-in/fan-out device. Each entry in the trunk table 404 includes a bit for each output port in the fan-in/fan-out device. A bit is set to '1' to indicate that the frame can be forwarded through the respective output port. The entry for hash value=0 indicates that the frame can be forwarded through port 0, 1 and U. The entry for hash value=5 indicates that the frame can be forwarded through port 1 and U.

The echo suppression table includes an entry for each input port. For example, echo suppression table 400 in logical fan-in/fan-out device 200-1 has an entry for input ports 0, 1, 2, and D. Each echo suppression table entry has a bit for each output port in the switch device. For example, each echo suppression table entry in echo suppression table 400 in logical fan-in/fan-out device 200-1 has a bit for output ports 0, 1, 2, and U. A bit is set to '1' if a received frame can be forwarded through the port. A bit is set to '0' to echo suppress the frame.

Port 0 and Port 2 are members of trunk group 0. Thus, a frame received on port 0 cannot be forwarded through port 0 or port 2. Similarly, a frame received at port 2 cannot be forwarded through port 2 or port 1. Referring to echo suppression entries in echo suppression table 400, bits for port 0 and port 2 are set to '1' in the entries for port 0 and port 2 to echo suppress frames received on members of trunk group 1. However, frames received by port 1 can be forwarded to any port other than port 1 because only the bit for port 1 is set to '0'.

All frames received through ports 0, 1 and 2 which are not echo suppressed are forwarded through the U port. Thus, even if the selected hash value for the frame is '0' and the frame for trunk group 1 is forwarded through port '0' in logical fan-in/fan-out device 200-1, which is a member of trunk group 1, the frame is still forwarded needlessly through the U port because the U-bit in each entry in the hash table is set to '1'.

The forward vector for a frame received on port 1 in logical fan-in/fan-out device 200-1 with a hash value of 5 is computed by combining the entry for input port 1 set to '1011' selected in Local EST 400, the selected PFV set to '1011' in the PFV table 402 and the entry for hash value 5 set to '0101' in trunk table 404. A logical 'AND' of '1011' from local EST 400, '1011' from the PFV table 402 and '0101' from the hash table 404 results in a forward vector set to '0001' and the frame is forwarded through the U port on connection 300-1 to ingress device 202-1.

Ingress device 202-1 has input ports labeled U0, U1 and output ports labeled 0, 1, 2. Matrix echo suppression table ("EST") 406 has an entry for each external port (labeled 0-17) in the multistage switch 300. Each echo suppression table entry has a bit for each of the ingress device's output ports. The entry for port 1 is selected because the frame was received on port 1. PFV Table 408 has a bit for each output port, a bit set to '1' indicates that the frame can be forwarded through the respective output port. The selected PFV in the PFV table 408 indicates that a received frame for trunk group T1 can be forwarded through output port 0 or port 2 because members of trunk group T1 can be reached through output port 0 or port 2. Trunk table 410 has an entry for each hash value. Each entry in trunk table 410 includes a bit for each output port 0, 1, 2. The bit is set to indicate that the frame can be forwarded through the respective output port 0, 1, 2. The received frame for trunk group T1 is forwarded through ports 0 and 2 based on a forward vector of '101' computed by combining selected matrix EST vector '111' with PFV '101' and trunk member vector '111' using a logical 'AND' function.

Egress device 204-1 has three input ports labeled 0, 1, 2 and two output ports labeled D0 and D1. Trunk table 416 has an entry for each hash value and each entry has a respective bit for each internal output port in the egress device 204-1. A bit is set to '1' if the frame can be forwarded on the respective port. PFV Table 414 has a bit for each output port, the state of the bit indicates whether the frame can be forwarded through the respective output port. Matrix echo suppression table 412 has an entry per external port (0-17) with each entry having a bit for each output port, the state of each bit indicating whether the frame can be forwarded through the respective port.

ANDing the echo suppression entry for external port 1 set to '01' with PFV 414 set to '11' and the entry for hash value=5 in trunk table 416 set to '11' results in a forward vector of '01' and the frame is forwarded on D1 to logical fan-in/fan-out device 200-2.

Matrix EST 418 in logical fan-in/fan-out device 200-2 has an entry for each external port (0-17) in the multistage switch 300. Each matrix EST entry has a bit for each output port 0, 1, 2, U. The bits are set so that a frame is not forwarded through the port at which it was received. The PFV entry in PFV table 420 in logical fan-in/fan-out device 200-2 has a bit for each output port, the state of each bit indicating whether the frame can be forwarded to the destination through the respective output port. Trunk table 422 in logical fan-in/fan-out device 200-2 has an entry for each hash value, each entry having a bit per output port in the fan-in/fan-out device 200-2. ANDing the selected entries in each table for a frame received on external port 1 results in forward vector '0000' and the forward frame is dropped; that is, the frame was not forwarded to any output ports. Thus, the frame was needlessly forwarded through egress device 204-1 to logical fan-in/fan-out device 200-2. The frame is also forwarded through internal outport port 2 in ingress device 202-1 to row 104-3.

Figure 4B:
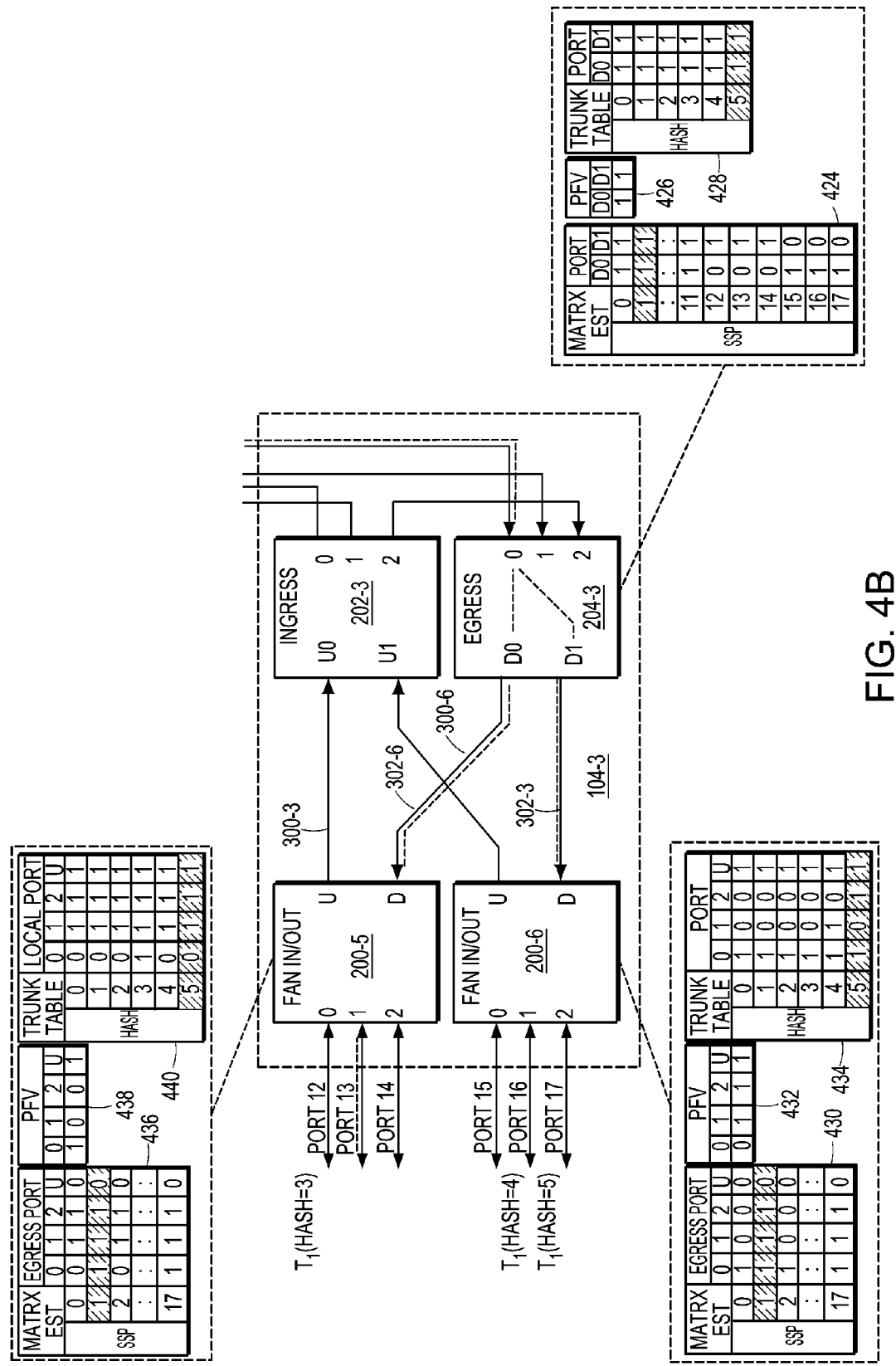

FIG. 4B is a block diagram of row 104-3 in the multi-stage switch 300 shown in FIG. 3. Egress device 204-3 receives the forwarded frame on input port 0 and determines where to forward the frame dependent on selected entries in tables 424, 426, 428. The entry for external port 1, the external port at which the frame was received is selected in Matrix EST 424. Each Matrix EST entry has a bit for each output port in ingress device 204-3. Output port D0 is coupled to logical fan-in/fan-out device 200-5 and output port D1 is coupled to logical fan-in/fan-out device 200-6. Logical fan-in/fan-out devices 200-5, 200-6 both include members of trunk group T1. Thus, bits for D0 and D1 in the Matrix EST are set to '1' to indicate the received frame can be forwarded. Also, bits from D0 and D1 are set to '1' in the selected PFV in PFV table 426 and in the selected trunk table entry in trunk table 428. Thus, the forward vector is '11' and the frame is forwarded to logical fan-in/fan-out device 200-5 on path 302-6 and to logical fan-in/fan-out device 200-6 on path 302-3.

In logical fan-in/fan-out device 200-5, the forwarded frame is dropped because the trunk table entry for hash value 5 in trunk table 440 disables forwarding through external port 12 (port 0 in logical fan-in/fan-out device 200-5) even though the matrix EST entry for external port 1 in matrix EST 436 and the PFV in PFV table 438 for the destination address enables forwarding through logical fan-in/fan-out device port 0.

In logical fan-in/fan-out device 200-6, the frame is forwarded through fan-in/fan-out device port 2 (labeled external port 17) because the matrix EST entry for external port 1 in the matrix EST table 430, the trunk table entry for hash value 5 in trunk table 434 and PFV in the PFV table 432 all allow forwarding through fan-in/fan-out device port 2. As shown in FIG. 4B, the frame was needlessly forwarded through logical fan-in/fan-out device 200-5.

Figure 5:
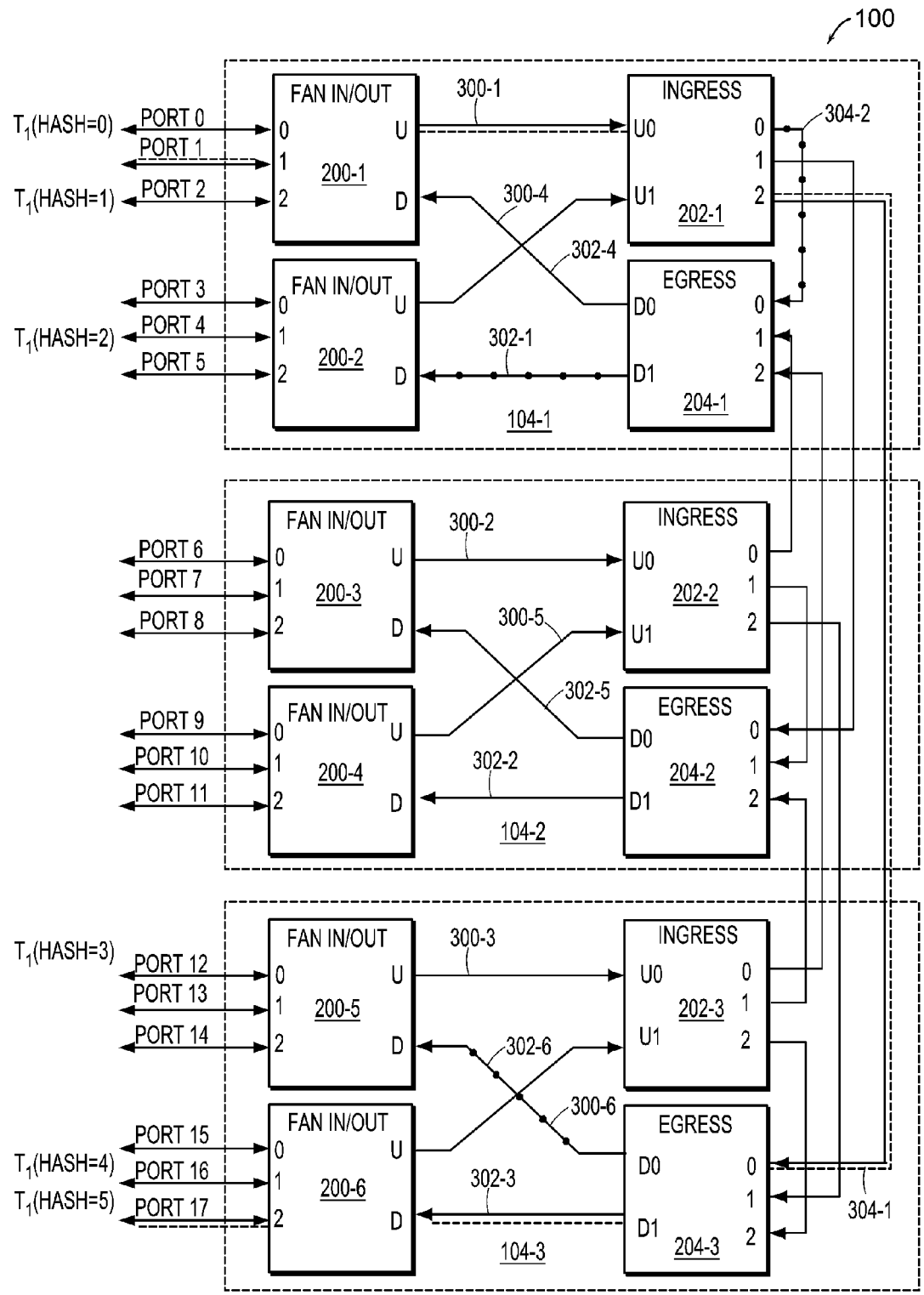
FIG. 5 illustrates matrix trunk aware forwarding according to the principles of the present invention.

FIG. 5 is a block diagram of the multistage switch shown in FIG. 3 illustrating trunk aware forwarding according to the principles of the present invention. A frame received on external port 1 is forwarded on the dashed path to ingress device 202-1, egress device 204-3 and logical fan-in/fan-out device 200-6, but is not forwarded on the dotted path to egress device 204-1 logical fan-in/fan-out device 200-2 and logical fan-in/fan-out device 200-5. Each switch device having information for a member of the trunk group T1 performs trunk aware forwarding to reduce the number of ports through which a frame is forwarded, resulting in reducing internal data traffic in the multistage switch 300.

Figure 6A:
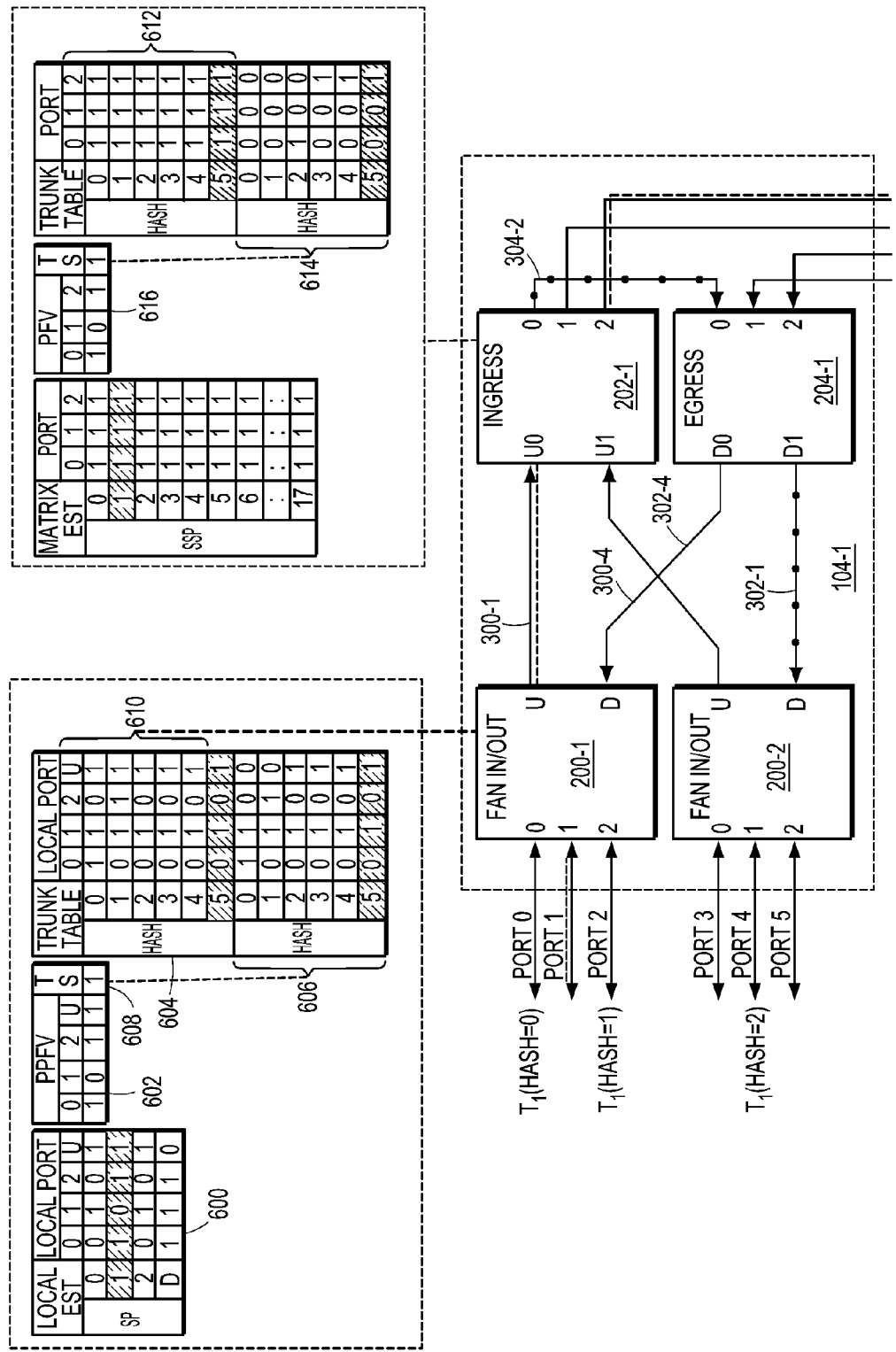
FIG. 6A-6B illustrate the forwarding tables providing trunk aware forwarding in rows of the multistage switch devices shown in FIG. 5.

FIG. 6A is a block diagram including switch devices in row 104-1 in FIG. 5 showing tables providing trunk aware forwarding included in the switch devices. As shown, switch devices 200-1, 202-1 include a trunk table for trunk group T1. Each entry in PFV table 602 in logical fan-in/fan-out device 200-1 has a table select field. The table select field selects a trunk table dependent on the respective destination address in a received frame. If the destination address is a trunk, the trunk table for the trunk is selected by the trunk table select field. If the destination address is not a trunk, the default trunk table is selected. The default trunk table is the trunk table that was described in conjunction with FIGS. 4A-4B. Logical fan-in/fan-out device 200-1 includes a trunk table 606 for trunk group T1 because external ports 0 and 2 are members of trunk T1.

A frame received on external port 1 for trunk T1 selects a PFV entry in the PFV table 602 for the trunk's destination address. The Table Select (TS) field 608 in the PFV entry set to '1' to select trunk table 606. The trunk table entries for hash value 0 and hash value 1 in trunk table 606 differ from the entries in default trunk table 610 so that frames forwarded to the trunk on external port 0 and external port 1 are not unnecessarily forwarded on uplink port U through connection 300-1 to ingress device 202-1.

As shown, in trunk table 606 the U bit is set to '0' in the trunk table entries for hash value=0 and hash value=1, to disable the forwarding of frames on the U port to ingress device 202-1. By providing selectable trunk tables and a table select field 608, in the PFV entry, frames for members having a hash value=0 or a hash value=1 of trunk group T1 received by logical fan-in/fan-out device 200-1 can be pruned in logical fan-in/fan-out device 200-1.

Frames that are not destined to trunk T1 members (hash=0, hash=1) logical fan-in/fan-out device 200-1 are forwarded through the U port on path 300-1 to ingress device 202-1. In ingress switch device 202-1 table select 616 in the selected PFV entry selects trunk table 614 for trunk group T1. The trunk table entry for hash value=5 forwards of the frame only through output port 2. Thus the frame is pruned in ingress switch device 202-1 by not forwarding the frame through port 0. Ingress switch device 202-1 receives frames on internal input port U0 from logical fan-in/fan-out device 200-1 and on internal input U1 from logical fan-in/fan-out device 200-2. Frames are only forwarded on output port 0 when the hash value is 2 and on output port 2 when the hash value is 3, 4 and 5. Thus, frames with hash values 0, and 1 received at logical fan-in/fan-out device 200-1 are pruned at logical fan-in/fan-out device 200-1. Also frames received on external ports 3 and 5 for a member of trunk group T1 by logical fan-in/fan-out device 200-2 with hash values 0 and 2 are pruned at ingress device 202-1 so that the frames are only forwarded to external ports 0 or 2 through logical fan-in/fan-out device 200-1. Frames received by ingress device 202-1 with hash value 2 is forwarded through output port 0 to egress device 204-1. Frames received with hash values 3, 4, and 5 are forwarded through output port 2 to row 104-3.

Figure 6B:
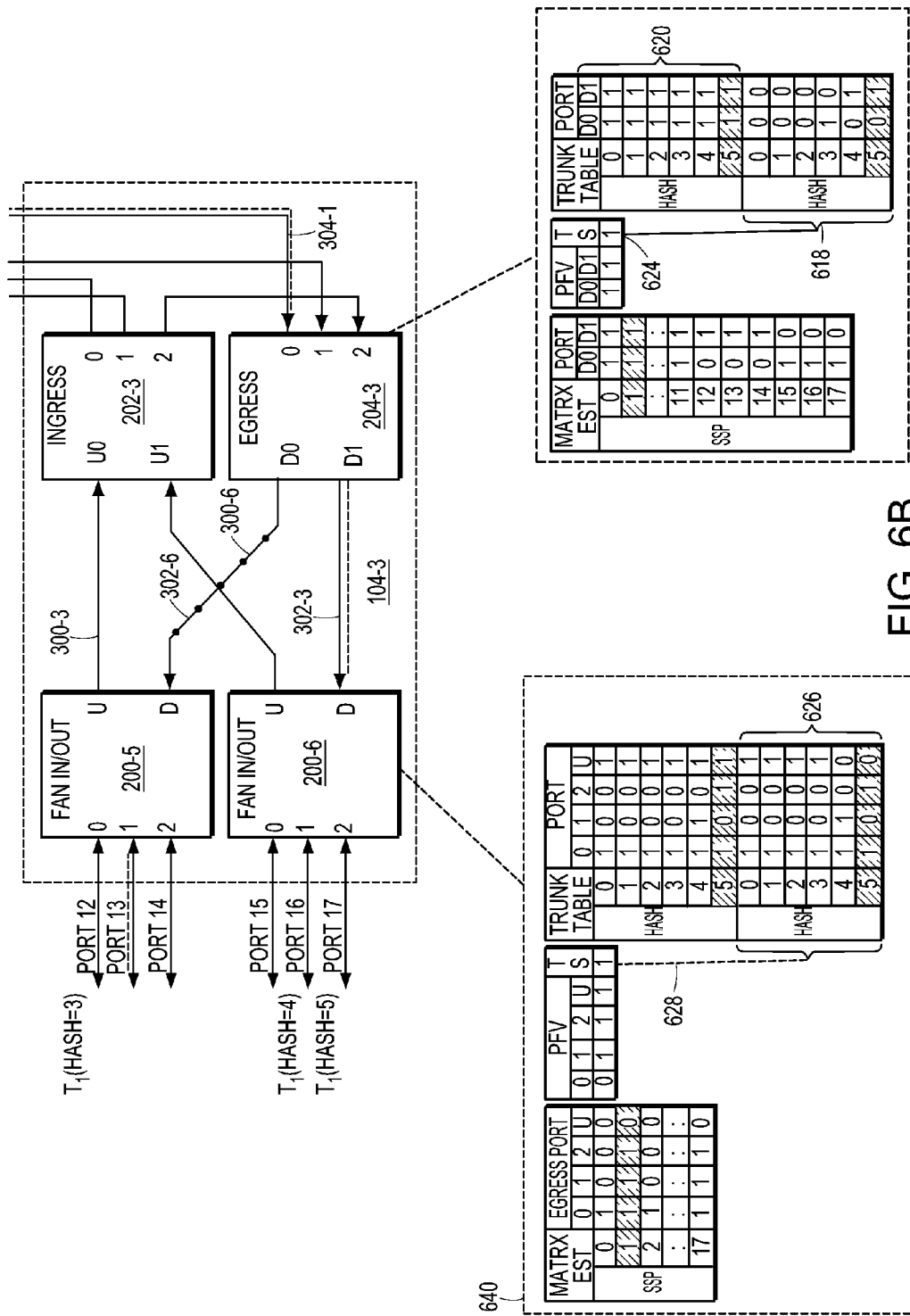

FIG. 6B is a block diagram of row 104-3 shown in FIG. 5 showing tables providing trunk aware forwarding included in the switch devices. Egress device 204-3 includes trunk tables 618 and 620. Trunk table 618 is selected by Table Select 624 for all frames received for trunk group T1. Frames for hash values 0, 1 or 2 for trunk group T1 are not received because they are pruned by switch devices in row 104-1 as described in conjunction with FIG. 6A. Thus, neither of the outputs D0 and D1 is selected in trunk table 618 for hash 0, 1, and 2. Frames received for hash value 3 are forwarded to output port D1 because the bit for D1 is set '1'. Frames received for hash values 4 and 5 are forwarded to logical fan-in/fan-out device 200-6. Thus, frames for trunk group T1 are only forwarded to logical fan-in/fan-out device 200-5 if the hash value is 3. Frames with hash values 4 and 5 are pruned by not being forwarded to logical fan-in/fan-out device 200-5 on path 302-6.

Frames for trunk group T1 with hash values 4 and 5 are received by fan-in/fan-out device 200-6 on input port D. Trunk table 626 for trunk group T1 is selected by table select 628 when fan-in/fan-out device 200-6 receives a frame for trunk group T1. Frames for hash values 4 and 5 are not forwarded to the uplink port to ingress device 202-3. Frames for hash value 5 are forwarded through fan-in/fan-out device port 2 (labeled external port 17) and frames for hash value 4 are forwarded through fan-in/fan-out device port 1 (labeled external port 16). Thus, trunk aware forwarding allows traffic for a trunk group to be pruned in each multistage switch device by providing a trunk table for the trunk in each switch device having a member of the trunk and storing a table select with the PFV.

Figure 7:
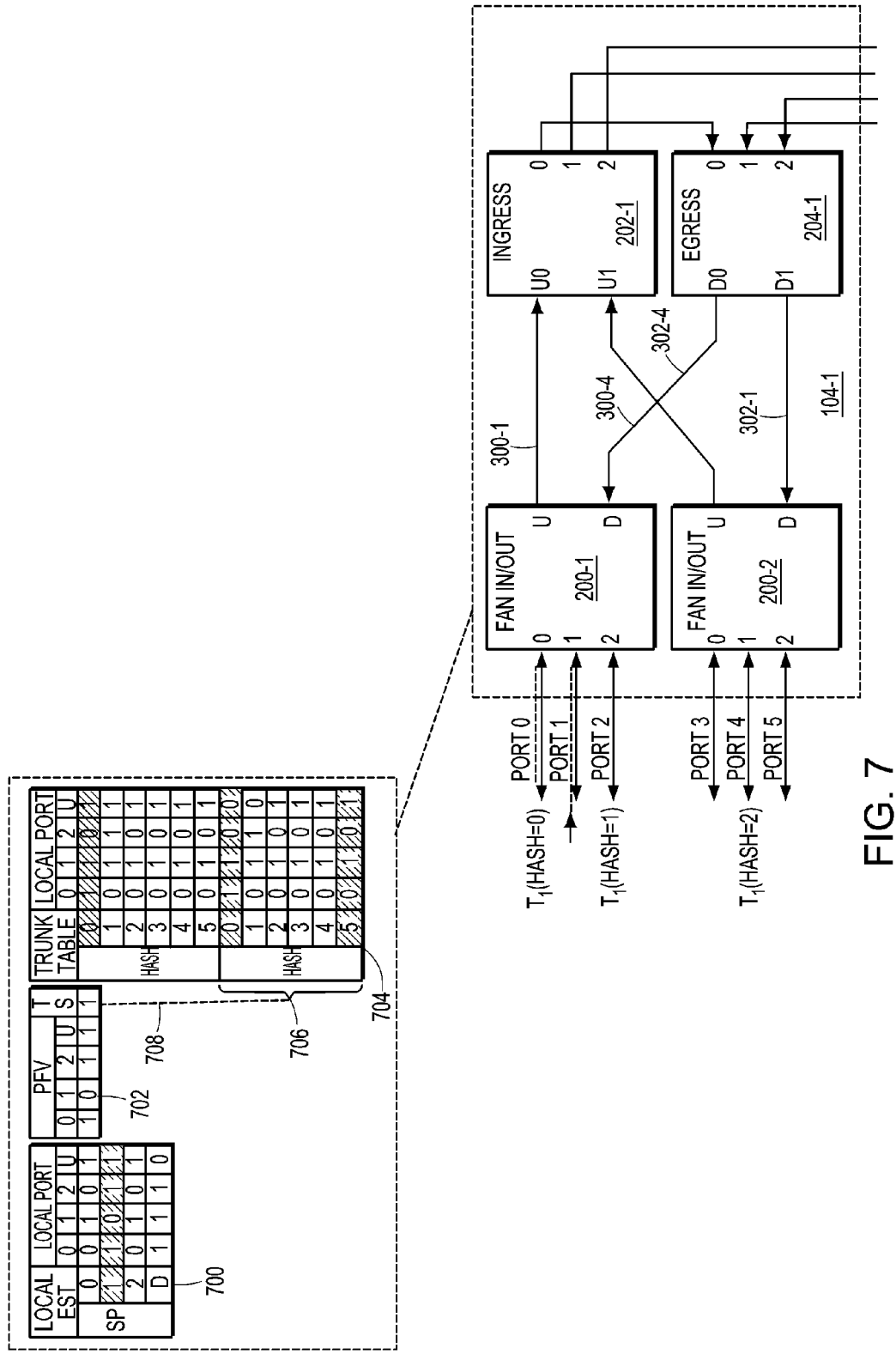
FIG. 7 illustrates the pruning of a frame in the fan-in/fan-out device in which the frame was received.

FIG. 7 illustrates trunk aware forwarding which prunes a frame in the fan-in/fan-out device at which the frame was received. Trunk group T1 has two members on fan-in/fan-out device 200-1; that is, port 0 and port 2. The frame is received at port 1 of fan-in/fan-out device 200-1 and is destined to trunk group T1. The echo suppression vector selected in the local echo suppression table 700 for port 1 ensures that the frame is not forwarded through external port 1. The physical forward vector selected by the destination address for T1 in the PFV table 702 selects trunk table 708 for trunk group T1. The computed hash for the source address and destination address included in the frame is 0. The trunk member vector in trunk table 708 for "computed hash"=0 selects external ports 0 and 1 for forwarding the frame. The forward vector is computed by combining the selected echo suppression vector, physical forward vector and the trunk member vector. The forward vector selects external port 0 for forwarding the frame. Thus, the frame is not forwarded through the matrix of switch devices. As a result, no unnecessary traffic is forwarded through the multistage switch.

Figure 8A:
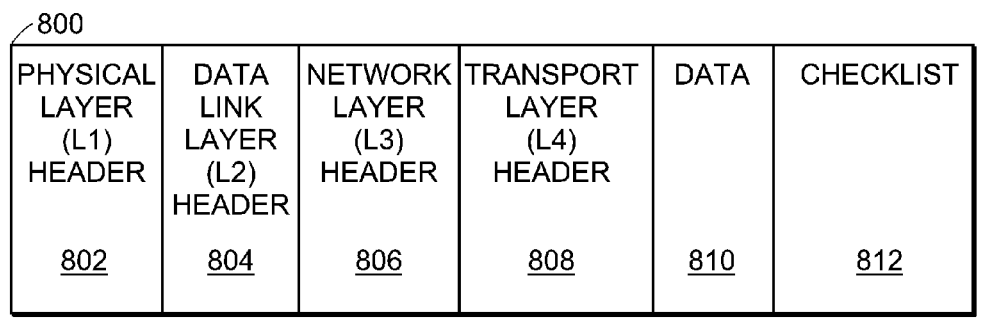
FIG. 8A illustrates a frame which may be received at any of the external ports in the multistage switch shown in FIG. 1.
Figure 8B:
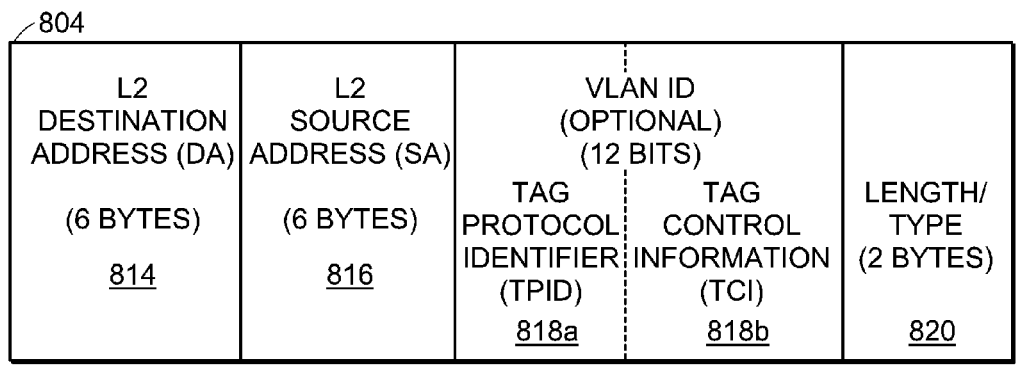
FIG. 8B illustrates the format of an Ethernet data link (L2) header shown in FIG. 8A.

FIG. 8A illustrates a prior art frame 800 which may be received at any of the external ports 132-0, . . . 132-12n in the multistage switch 100 (FIG. 1). FIG. 8B illustrates a prior art Ethernet header which may be included in the frame 800 shown in FIG. 8A. FIG. 8C illustrates a prior art Internet Protocol ("IP") header which may be included in the frame 800 shown in FIG. 8A.

Turning to FIG. 8A, the frame 800 includes a data payload 810 and headers for networking layers 802, 804, 806, 808. Headers for four of the layers in the Open Systems Interconnection ("OSI") model are shown, the physical layer (L1) header 802, the data link layer (L2) header 804, the networking layer (L3) header 806 and the transport layer (L4) header 808. For example, the data link layer (L2) header 804 may be Ethernet and the networking layer (L3) header 806 may be IP. The frame 800 also includes a checksum 812.

Turning to FIG. 8B, the Ethernet data link (L2) header 804 includes a device address for the destination 112 (FIG. 1); that is, the L2 destination address 814, and a device address for the source 102a, 102b (FIG. 1); that is, the L2 source address 816, an optional Virtual Local Area Network Identification ("VLAN ID") field 818 and a length/type field 820. The VLAN ID 818 includes a Tag Protocol Identifier ("TPI") field 818a and a Tag Control Information ("TCI") field 818b. The VLAN ID field 818 provides support for VLAN switching based on IEEE 802.1Q tagging and IEEE 802.1D 1988 (802.1p) priority levels.

Turning to FIG. 8C the IP network layer (L3) header 806 includes a network address for the source 102a, 102b (FIG. 1), that is the IP source address 844, and a network address for the destination 112 (FIG. 1), that is, the IP destination address 846. Other fields in the IP network layer header 806 include Version 822, HLEN 834, Type of Service ("TOS") 836, Total Length 828, Identification 830, Flags 832, Fragment Offset 834, Time to Live ("TTL") 836, Protocol field 840, Header Checksum 842, Options 848 and pad 850. A frame 800 (FIG. 8A) received from a source 102a, 102b (FIG. 1) is bridged to one or more external ports dependent on the destination address 814 (FIG. 8B) stored in the Ethernet data link (L2) header 804 (FIG. 8A) or is routed to one or more external ports dependent on the IP destination address 846 stored in the IP network layer (L3) header 806.

As discussed in conjunction with FIG. 6A, a forwarding decision is made in the switch devices in the multistage switch 100 dependent on a flow hash. Typically, the flow hash is computed based on Media Access Control Source Address ("MACSA"), Media Access Control Destination Address ("MACDA"), Internet Protocol Destination Address ("IPDA"), Internet Protocol Source Address ("IPSA"), and L2 ports stored in the header of the received frame. The MACSA, MACDA, IPDA, IPSA, and L2 have already been described in conjunction with FIGS. 8A-8C. The flow hash provides temporal ordering for a given flow.

Figure 9:
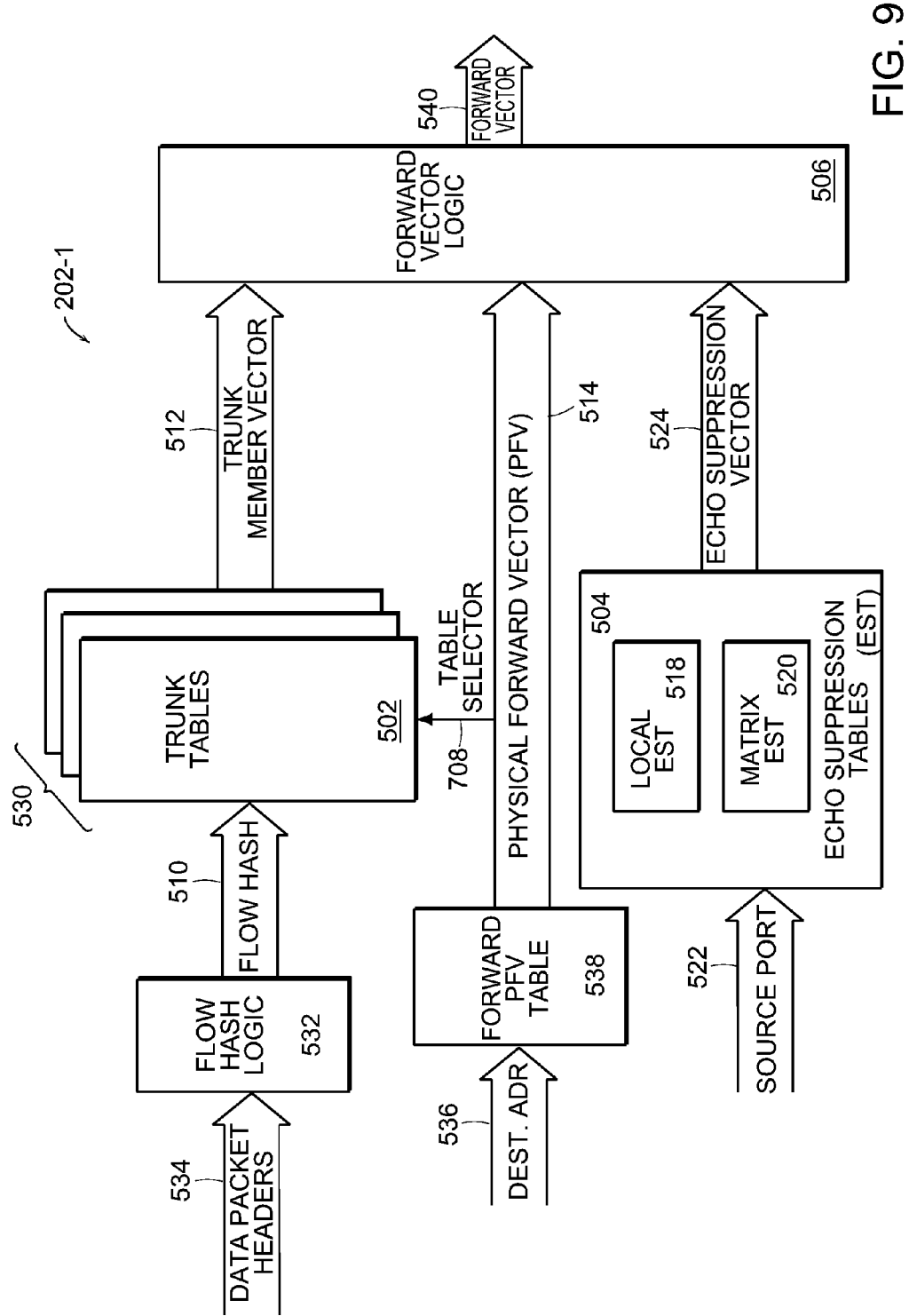
FIG. 9 illustrates vectors and tables in each of the switch devices shown in FIG. 2

FIG. 9 illustrates vectors and tables in one of the switch devices 200, 202, 204 shown in FIG. 2 for computing a forward vector 540 for a received frame. The forward vector 540 is computed by combining a trunk member vector 512, a physical forward vector (PFV) 514 and an echo suppression vector 524 for the frame. The PFV 514 selects all the ports through which the frame can be forwarded to a destination. The echo suppression vector 524 ensures that an incoming frame is not forwarded to the same port at which it was received or to other ports which are members of the same trunk group as the source port. The trunk member vector 512 selects one of the selected ports in the PFV through which to forward the frame to the destination so that frames for the same flow (same source and destination address) are forwarded through the same external port.

The PFV 514 is selected from the forward PFV table 538 dependent on the destination address 536 included in the received frame. The destination address 536 is either the IP destination address 846 (FIG. 8C) or the MAC DA 814 (FIG. 8B) dependent on the frame type. The PFV 514 includes a bit for each output port in the switch device. A port bit is set to '1' to enable forwarding to the respective port and set to '0' to disable forwarding to the respective port, thereby indicating all the ports to which a received frame can be forwarded to the destination. If the destination can be accessed through a trunk group, a port bit is set to '1' in the physical forward vector for all members of the trunk group.

The echo suppression vector 524 ensures that the frame is not forwarded through the port through which it was received. The echo suppression tables 504 includes a local echo suppression table 518 and a Matrix echo suppression table 520. The local echo suppression table 518 ensures that a frame is not forwarded through the local port or a member of the same trunk as the local port on which it was received. The Matrix echo suppression table 520 ensures that a frame is not forwarded through any external port which is a member of the trunk on which the frame was received.

In a multistage switch which supports trunking, frames can be forwarded to a destination on through any of the members of the trunk group. In a multistage switch which supports trunking across external ports on different switch devices it is necessary to identify which external ports belong to the same trunk group on which the frame was received. As a result, the external port number; that is the port at which the frame is received is used to index the Matrix echo suppression table 520. The indexed entry ensures that the frame is not forwarded through a member of the trunk on which it was received.

The matrix EST table 520 filters frames based on external ports (0-17) to the multistage switch so that a frame is not forwarded to the external port of any of the members of a trunk group through which it is received. Referring to FIG. 7, the local EST table 700 in logical fan-in/fan-out device 200-1 filters frames received on local input ports 0, 1, 2, D. Referring to FIG. 6B, the matrix EST table 640 in logical fan-in/fan-out device 200-6 filters frames received on external ports 0-17.

Returning to FIG. 9, for example, if external port 0, 2 and 3 are all members of the same trunk group, an incoming data frame on external port 0 cannot be forwarded to external ports 0, 2 or 3 because they are all part of the same trunk group. The echo suppression table 504 stores group membership information for the trunk and ensures that such echoing will not occur. The trunk member vector 512 provides a mask for the physical forward vector (PFV) 514, to select one of the enabled ports, through which to forward the received frame.

The array of trunk tables 530 includes a trunk table 502 for each trunk group in the multistage switch having a local member. The flow hash logic 532 in the switch device creates a computed flow hash 510 derived from the source and destination address included in headers 534 in the received frame. The computed flow hash 510 ensures that frames received for the same data flow are forwarded through the same destination. The array of trunk tables 530 includes a default trunk table which is used for all destination addresses other than the destination address for a trunk group.

The trunk group table for a particular trunk group is used in the following situations: (1) when the frame is destined only to the trunk group, (2) the frame is destined to the trunk group and local non-trunk groups, (3) the frame is destined to the trunk group and another trunk group that only has members locally and (4) when the frame is destined to the trunk group and to another trunk group that has the same hash code distribution in the trunk table.

The trunk table for a trunk group is selected by a trunk table selector 708 included in the PFV. The table selector selects a trunk table dependent on the respective destination address. If the destination address is a trunk, the trunk table for the trunk is selected by the trunk table select field. If the destination address is not a trunk, the default trunk in the array of trunk tables 530 is selected.

Each trunk member has a "matrix assigned" hash code. A received frame is forwarded towards a trunk member if the "matrix assigned hash code" matches the "computed hash code" computed by the flow hash logic 532.

A frame may be destined to two or more groups that do not use the same hash code distribution in the Trunk Table 502. Therefore, more Trunk Tables 502 are required when frames are sent to two or more trunk groups. The absolute maximum number of Trunk Tables 502 required is $2^n+1$, where 'n' is the maximum number of trunk groups subtended by the switch device and '1' is the default trunk table. For example, in an ingress device 202-1 (FIG. 3) with n=6 ingress ports, there is a maximum of six trunk groups subtended by the device and all six trunk groups require different hash distribution on the uplink port. Thus, the absolute maximum number of Trunk Tables is $2^6+1=65$.

If a trunk group shares a single Trunk Table 502 with traffic destined to non-trunk ports or other trunk ports, the ingress device 202-1 must send a received frame destined to a member of a trunk group to all egress devices that include members of the trunk group. Thus, if a trunk group has members on twelve egress devices, the received frame must be forwarded to all twelve egress devices.

The number of egress devices 204-1 (FIG. 2) to which the received frame must be forwarded can be reduced by providing selectable trunk tables 530. However, the maximum number of Trunk Tables 532 is much larger than that required for an ingress device 202-1 (FIG. 4). For example, if each egress device 204-1 (FIG. 2) subtends six different trunk groups, the maximum number of tables is $2^{(12\times 6)}+1$ in a multi-stage switch including a fan-in/fan-out device 200-1 with six ports and twelve ingress devices 202-1. The number of tables is much larger if the fan-in/fan-out device has 24 ports.

The number of selectable trunk tables 530 can be reduced by using fixed hash code distributions. Trunk groups are spread across the ingress devices 202. Trunk groups that do not have slots in common in the trunk tables 530 can be placed in the same trunk table without causing overlap of hash codes. However, trunk groups that reside on the same ingress device 202 may have hash code overlap. If the trunk groups on the same ingress device 202 use the same hash codes, there is no overlap and the trunk groups may share a trunk table 502 without causing superfluous traffic in the matrix. Hash code combinations are restricted by using fixed distributions for all trunk groups that have the same number of slots in common.

For example, if trunk group 1 and trunk group 2 have ports on ingress device 4 in common; that is, hash codes 32-63. The two trunk groups can share a single trunk table by using fixed hash code distributions.

Figure 10B:
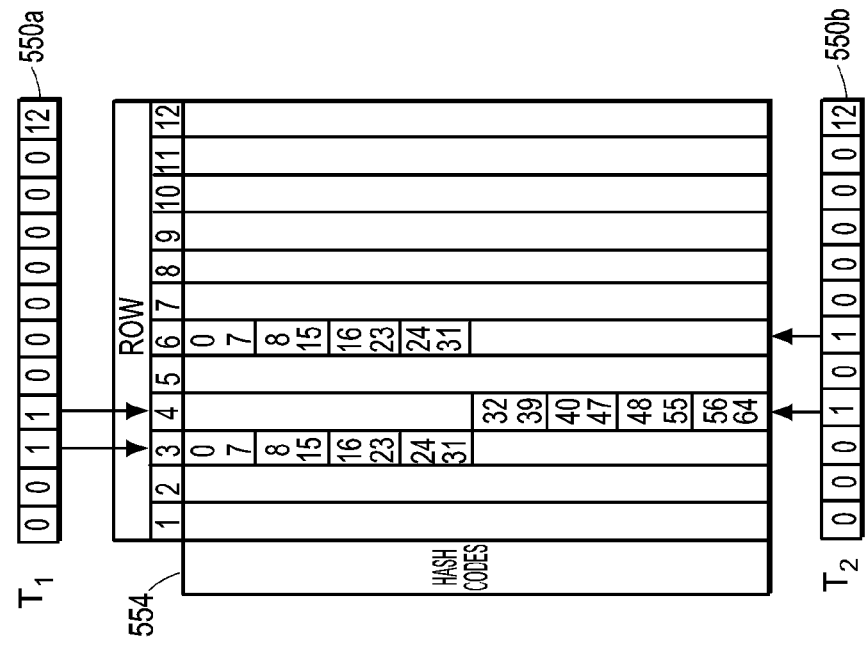
FIG. 10B illustrates the two trunk groups shown in FIG. 10A with each trunk group having the same hash code distribution.
Figure 10A:
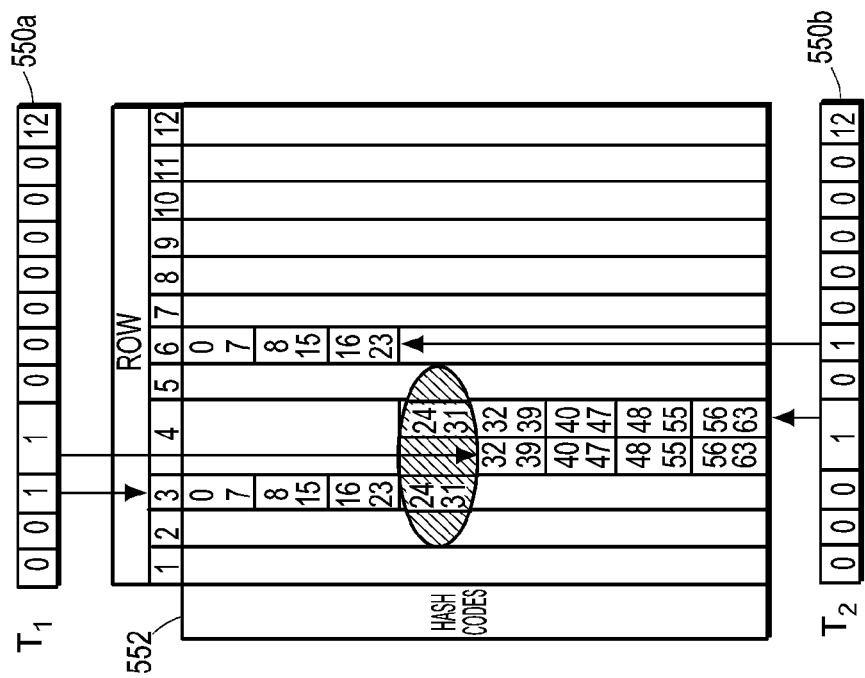
FIG. 10A illustrates two trunk groups sharing a single trunk table, each of the trunk groups having a different hash code distribution.

FIG. 10A illustrates two trunk groups 550a, 550b sharing a single trunk table 552, each of the trunk groups having a different hash code distribution. Trunk group T1 550a has members on rows 3 and 4. Row 3 uses hash codes 0-31 and row 4 uses hash codes 32-63. Trunk group T2 550b has members on row 4 and row 6. Row 4 uses hash codes 24-63 and row 6 uses hash codes 0-23. The total number of trunk tables required per switch device is reduced by sharing trunk tables.

In order to share a single table, row 4 is selected for all hash codes common to trunk group T1 and trunk group T2; that is, all codes between 24 and 63. However codes 24-31 are also stored for row 3 as shown. This results in unnecessary traffic through the matrix because a frame destined to trunk T1 with hash codes between 24 and 31 is sent to both row 3 and row 4. The frame destined to row 4 is not required and is subsequently dropped by either the egress device or the fan-in/fan-out device.

FIG. 10B illustrates the two trunk groups shown in FIG. 10A with each trunk group having the same hash code distribution. Two trunk groups can share a single trunk table to reduce the number of trunk tables required in a switch device. A trunk table can only be shared if the middle column values in the trunk table are the same. As shown, trunk group T2 uses the same hash code distribution as trunk group T1. Thus, codes 24-31 are moved from shared row 4 to row 6 for trunk group T2. After moving codes 24-31, only shared routes which also share the same row are stored in row 4; that is, the middle column values are the same. With this distribution of hash codes for trunk groups T1 and T2, there is no needless frame duplication for frames destined to trunk group T1 and trunk group T1 and T2 can share the same trunk table.

In an embodiment with three rows, hash codes can be distributed as follows: hash codes 0-20 for the first row, hash codes 21-41 for the second row and hash codes 42-63 for the third row. A total of 10 shared trunk tables are required for 220 configurations. In an embodiment with four rows, hash codes can be distributed as follows: hash codes 0-15 for the first row, hash codes 15-31 for the second row, hash codes 32-57 for the third row and hash codes 48-63 for the fourth row. A total of 21 shared trunk tables are required for 495 configurations.

Figure 11:
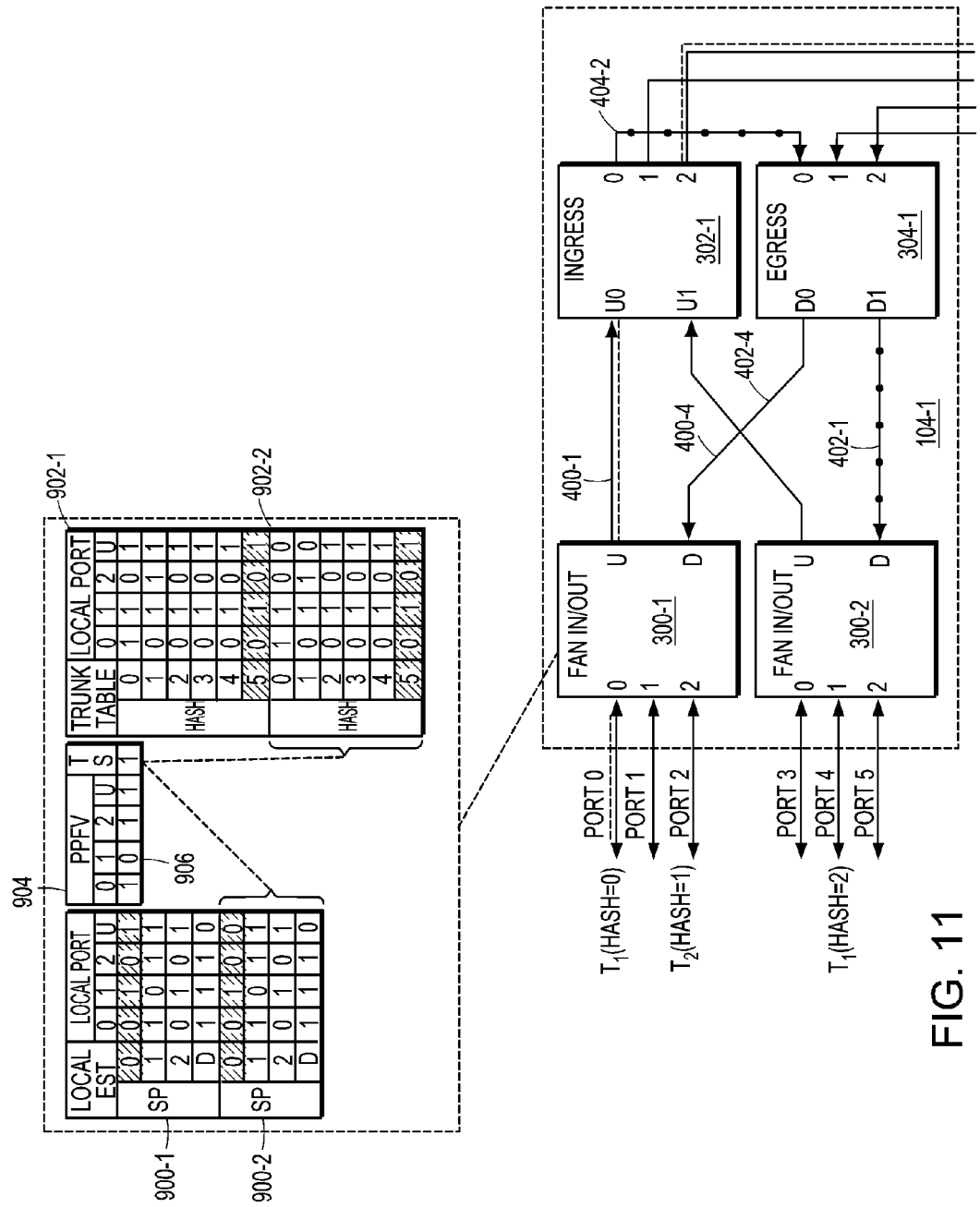
FIG. 11 illustrates an example of local echo suppression tables for reducing unnecessary traffic through the matrix for received unicast frames.

FIG. 11 illustrates an example of local echo suppression tables for reducing unnecessary traffic through the matrix for received unicast frames. The received unicast frames are destined to the same trunk group and the trunk group has members that are reached across the matrix.

The fan-in/fan-out device 200-1 can echo suppress frames received and destined to the same trunk group even when the trunk group has members that are reached across the matrix. This only applies to unicast frames. To suppress frames received for the same trunk group, each fan-in/fan-out device 200-1 has a plurality of echo suppression tables 900-1, 900-2, one per trunk group. For example, six echo suppression tables are required for a fan-in/fan-out device 200-1 with six ports because there can be a maximum of six multicast groups.

Thus, the selected PFV 906 in the PPFV table 904 selects a trunk table 902-1, 902-2 and an echo suppression table 902-1, 902-2 based on the switch input port at which the frame is received. If the frame is received by a member of a trunk group port and is destined to another port in the same trunk group, the frame is echo suppressed by not forwarding the frame through the uplink port of the fan-in/fan-out device 200-1.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
   a plurality of external ports;
   a plurality of devices organized into a plurality rows, each of the rows including a first fan-in/fan-out device, a second fan-in/fan-out device, and one or more switch devices, wherein:
   each device in a row is associated with a different respective stage of a plurality of stages;
   certain of the devices in a row are connected to each other through internal output ports;
   the first and second fan-in/fan-out devices are coupled to a number of the plurality of external ports and are configured to receive data frames, each of the data frames being associated with a logical link implemented in the apparatus; and
   the data frames are communicated on physical paths between one or more of the plurality of devices based on a forward vector determined based on a trunk member vector, a physical forward vector, and an echo suppression vector.

2. The apparatus as claimed in claim 1 wherein each of the one or more switch devices is configured to store a respective physical forward vector table.

3. The apparatus as claimed in claim 2 wherein the physical forward vector table includes a table select field.

4. The apparatus as claimed in claim 3 wherein the table select field determines selection of one of associated trunk tables dependent on a destination address in a received frame.

5. The apparatus as claimed in claim 3 wherein the physical forward vector table includes a bit value for each internal output port.

6. The apparatus as claimed in claim 5 wherein the bit value determines whether the data frames can be forwarded through an internal output port of the internal output ports.

7. The apparatus as claimed in claim 1 wherein each of the one or more switch devices includes a respective flow hash logic to index a flow hash when a data frame is received dependent on a destination address and a source address included in the data frame.

8. The apparatus as claimed in claim 1 wherein a data frame of the data frames is associated with a destination address, the destination address being included in a header corresponding to the data frame.

9. The apparatus as claimed in claim 1 wherein at least one of the plurality of devices is configured to store a respective echo suppression table.

10. The apparatus as claimed in claim 9 wherein each respective echo suppression table includes group membership information for an associated trunk.

11. The apparatus as claimed in claim 9 wherein each respective echo suppression table includes a bit value for each internal output port.

12. The apparatus as claimed in claim 11 wherein the bit value determines whether the data frames can be forwarded through an internal output port of the internal output ports.

13. The apparatus as claimed in claim 1 wherein a data frame of the data frames includes an IP network layer header.

14. The apparatus as claimed in claim 1 wherein the forward vector is computed by each of the one or more switch devices.

15. The apparatus as claimed in claim 1 wherein the forward vector selects an internal output port of the internal output ports through which the data frames can be forwarded to a destination.

16. The apparatus as claimed in claim 1 wherein the trunk member vector selects an internal output port of the internal output ports for forwarding data frames having same destination and source addresses to a destination.

17. The apparatus as claimed in claim 1 wherein the physical forward vector selects an internal output port of the internal output ports for forwarding the data frames.

18. The apparatus as claimed in claim 1 wherein the echo suppression vector reduces available internal output ports of the internal output ports by ensuring that a data frame is not forwarded through an internal output port at which the data frame was received.

19. A network comprising:
a multistage switch including:
  i) a plurality of external ports, a first number of the plurality of external ports configured to be coupled to a source of frames;
  ii) a plurality of devices organized into a plurality rows, each of the rows including a first fan-in/fan-out device, a second fan-in/fan-out device, and one or more switch devices, wherein:
    each device in a row is associated with a different respective stage of a plurality of stages;
    certain of the devices in a row are connected to each other through internal output ports;
    the first and second fan-in/fan-out devices are coupled to a number of the plurality of external ports and are configured to receive data frames, each of the data frames being associated with a logical link implemented in the apparatus; and
    the data frames are communicated on physical paths between one or more of the plurality of devices based on a forward vector determined based on a trunk member vector, a physical forward vector, and an echo suppression vector; and
a host coupled to a second number of the plurality of external ports of the multistage switch, the host being either a computer, another multistage switch or a router.

20. The network as claimed in claim 19 wherein each of the one or more switch devices is configured to store a respective physical forward vector table.

21. The network as claimed in claim 20 wherein the physical forward vector table includes a table select field.

22. The network as claimed in claim 21 wherein the table select field determines selection of one of associated trunk tables dependent on a destination address in a received frame.

23. The network as claimed in claim 19 wherein each of the one or more switch devices includes a respective flow hash logic to index a flow hash when a data frame is received dependent on a destination address and a source address included in the data frame.

24. The network as claimed in claim 19 wherein a data frame of the data frames is associated with a destination address, the destination address being included in a header corresponding to the data frame.

25. The network as claimed in claim 19 wherein a number of the plurality of devices are each configured to store a respective echo suppression table.

26. The network as claimed in claim 25 wherein each respective echo suppression table includes group membership information for an associated trunk.

27. The network as claimed in claim 19 wherein a data frame of the data frames includes an IP network layer header.

* * * * *